(12) United States Patent
Lamb

(10) Patent No.: US 11,836,609 B2
(45) Date of Patent: Dec. 5, 2023

(54) PHYSICAL NEURAL NETWORK OF OPTICAL RESONATORS AND WAVEGUIDES

(71) Applicant: Cody William Lamb, Chamblee, GA (US)

(72) Inventor: Cody William Lamb, Chamblee, GA (US)

(*) Notice: Subject to any disclaimer, the term of this patent is extended or adjusted under 35 U.S.C. 154(b) by 407 days.

(21) Appl. No.: 17/112,995

(22) Filed: Dec. 5, 2020

(65) Prior Publication Data

US 2022/0180163 A1  Jun. 9, 2022

(51) Int. Cl.
*G06N 3/067* (2006.01)
*G02B 6/10* (2006.01)
*G02F 1/01* (2006.01)

(52) U.S. Cl.
CPC .............. *G06N 3/067* (2013.01); *G02B 6/10* (2013.01); *G02F 1/011* (2013.01); *G02F 2201/58* (2013.01)

(58) Field of Classification Search
CPC ............................. G06N 3/067; G06N 3/0675
See application file for complete search history.

(56) References Cited

U.S. PATENT DOCUMENTS

| 2010/0176278 A1* | 7/2010 | Yokoyama | G06N 3/0675 257/85 |
| 2018/0309266 A1* | 10/2018 | Nakano | G06N 3/067 |
| 2021/0264241 A1* | 8/2021 | Karanth | G06F 9/5027 |

FOREIGN PATENT DOCUMENTS

WO  WO-2009096431 A1 *  8/2009  ........... G02F 1/0147

OTHER PUBLICATIONS

WO 2009096431 A1 English translation (Year: 2009).*

* cited by examiner

*Primary Examiner* — Charlie Y Peng

(57) ABSTRACT

Utilizing the principles of wavelength-dependent evanescent wave coupling in closely-spaced optical waveguides, along with optical resonators, a method for creating a neural network out of entirely electro-optical components is discussed. Optical resonators, which can store energy as standing waves or whispering gallery modes, act as neurons. Waveguides integrated onto a chip act as dendrites or connectomes, with coupling between them simulating the analog exchange of signals in brains. Additional electro-optic controls can be utilized, such as conductive plates utilizing the electro-optic effect to change the refractive indices of the optics and coupling coefficients based on electrical signals from outside stimuli.

7 Claims, 7 Drawing Sheets

PHYSICAL NEURAL NETWORK OF OPTICAL RESONATORS AND WAVEGUIDES

BACKGROUND OF THE INVENTION

In the rapidly expanding fields of machine learning and artificial intelligence, increasing the ability of machines to perform more and more complex calculations and predictions. Neural networking attempt to emulate a human brain by creating artificial memory cells and connecting them to other memory cells, simulating the neuron—connectome structure of a brain. The current limitation with this is that it is limited by computer memory and processing speed preventing memory cells from rapidly exchanging information as a human brain does. In the absence of faster computer time and memory retrieval, a different method is needed to simulate a human brain in hardware.

SUMMARY OF THE INVENTION

Using fundamental principles of physics such as total internal reflection, optical waveguides, evanescent waves and evanescent wave coupling, and optical resonators, an entirely linear optical system can be created to simulate a neural network, with electronic modulation controllers used for changing state nonlinearly. Optical resonators are often used in lab-on-a-chip devices for sensing purposes and waveguide coupling is a known phenomenon, though generally a phenomenon to be avoided in communications. By carefully engineering the optical resonator and optical waveguide structures, a neural network with many artificial neurons and rapid parallel signal transfer can be accomplished. Electro-optical modulators attached to an electronic control unit can provide a feedback mechanism to change the state of any given neural path or neuron and provide sensory input such as video from a camera, text, etc.

DETAILED DESCRIPTION OF THE DRAWINGS

Figure 1:
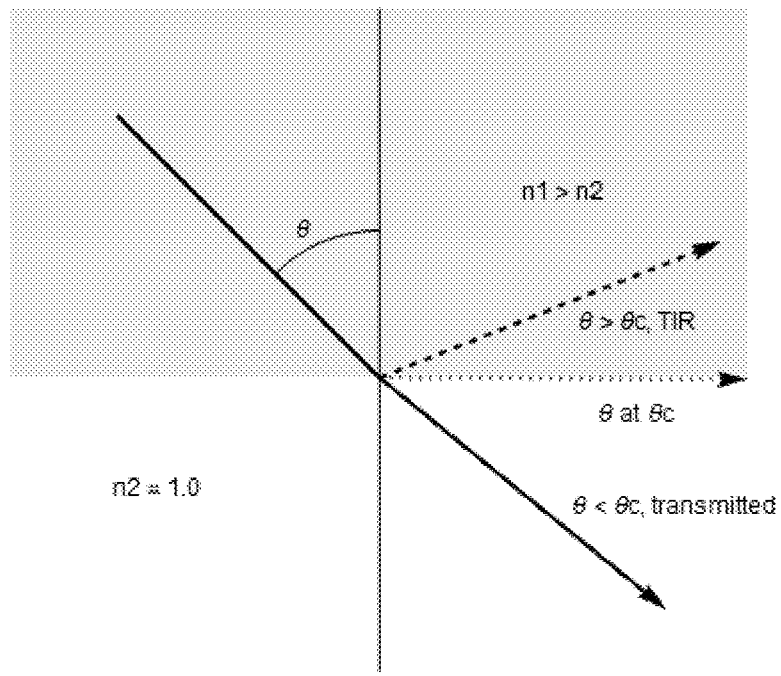
FIG. 1 is a diagram illustrating the basics of total internal reflection or refraction based on the angle of incidence of a beam of light at a surface where the index of refraction of the starting medium (n1) is greater than the index of refraction at the refracting medium (n2).

FIG. 1 is an illustration of Total Internal Reflection, an effect based off of Snell's Law, allowing light propagating in a medium of higher index of refraction to a region of lower index of refraction to completely reflect back into its higher index of refraction, with no propagating fields transmitting to the area of lower index of refraction. This allows for waveguides, where light is transmitted over a distance without escaping its guide, and for resonators where light can bounce around in a specific mode without escaping.

Figure 2:
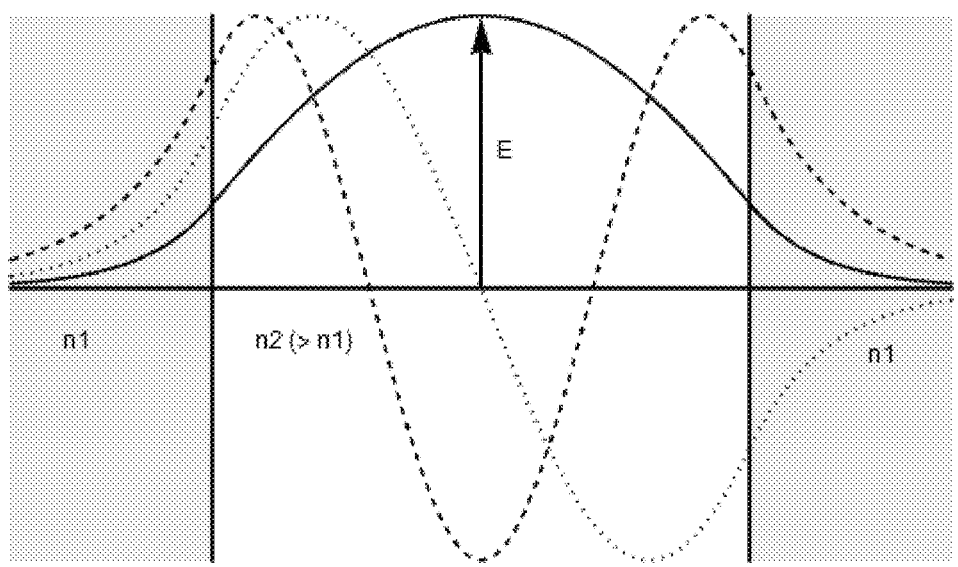
FIG. 2 is a view of transverse electric fields in a waveguide showing decaying exponential evanescent fields of three different exemplary modes against the edge of the waveguide as the wave undergoes total internal reflection back and forth into the waveguide.

FIG. 2 shows the transverse electric field amplitude over a cross-section of a rectangular waveguide with transverse electric polarization. Maxwell's equations force a sinusoidal solution in both the transverse direction (left and right) and the propagation direction (into the page). If the width of the waveguide is to small for a half-wavelength transverse mode, light of that wavelength will not propagate and the maximum wavelength of light that can propagate is referred to as the cutoff wavelength. If the width of the waveguide is larger than the wavelength, multiple modes can propagate. In this example, there are three separate modes propagating in the waveguide.

If the edges of the waveguide are perfectly-reflecting, conductive plates, the amplitude of the electric field would drop to zero at the sides, but in an interface of non-conductive refractive indices, Maxwell's equations force an exponentially decaying evanescent field in the lower-index region outside of the waveguide. These waves don't carry energy but can act to couple the wave to other outside materials placed close to the waveguide, often used in "lab-on-chip" devices and FTIR material analysis.

Figure 3:
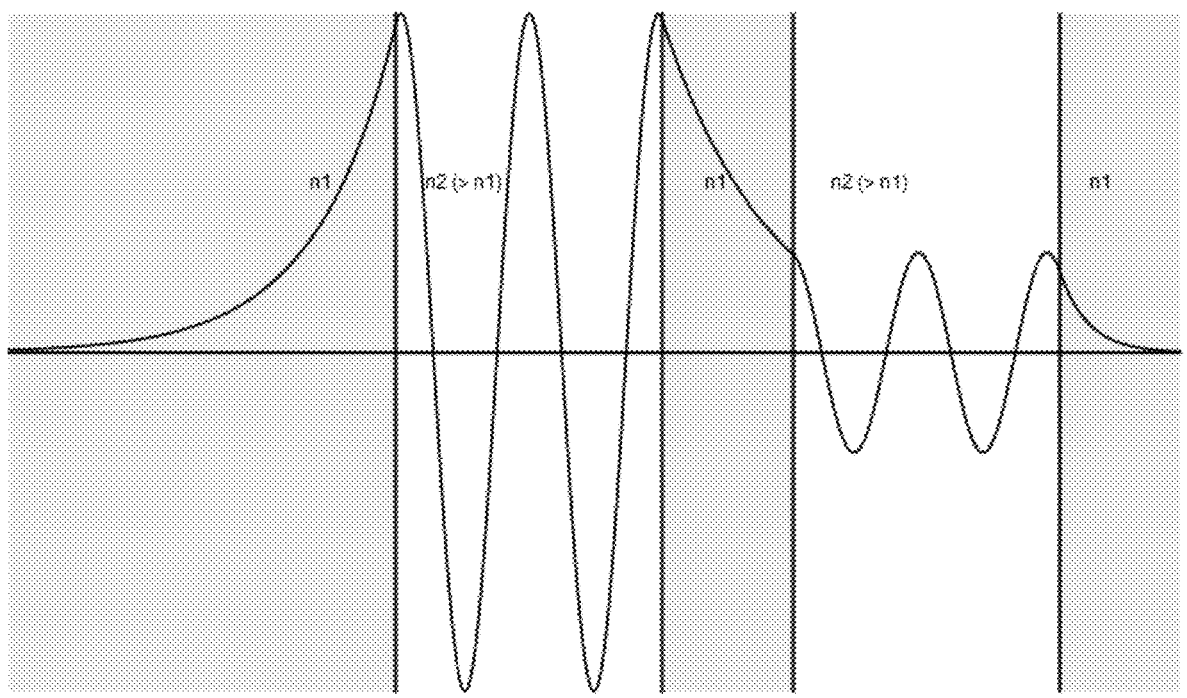
FIG. 3 is a view of transverse electric fields in a waveguide, similar to FIG. 2, but with evanescent wave coupling into a nearby waveguide running parallel.

FIG. 3 shows an example of electric field coupling from light propagating in one waveguide into a closely-spaced adjacent waveguide through evanescent field coupling. This is analogous to an electron in a finite-potential "particle in a box" in quantum mechanics having an exponentially decaying probability of being located in a higher-potential area or potentially tunneling through a high potential region to another lower-energy well. The more closely spaced the waveguides are, the higher the coupling and also the lower the index difference between the guided regions and surrounding material, the higher the coupling. This allows waves to transfer completely or partially from one waveguide to another, depending on the coupling coefficient and propagation length of the coupling region. In general, single mode propagation is desired, however a high-order mode is shown in the diagram to emphasize the effect of evanescent waveguide coupling.

Figure 4:
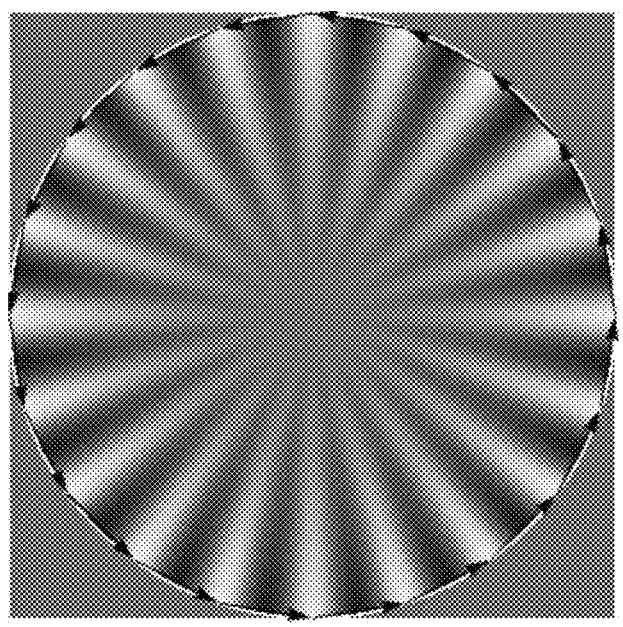
FIG. 4 is an illustration of whispering gallery modes in a circular, cylindrical or spherical optical resonator.

FIG. 4 is an illustration of a more unique kind of reflection, known as "whispering gallery modes". These modes were first observed by Lord Rayleigh at St. Paul's Cathedral where a whisper on one side of a circular chamber could be heard on the opposite side. If the whisper is at the correct angle and frequency to excite a mode, it can bounce repeatedly against the edge of the chamber and be heard clearly a far distance away. In optics, with a circular, cylindrical or spherical region of higher index of refraction, and a surrounding medium of lower index of refraction, whispering gallery modes can be excited in optical structures allowing waves to continuously bounce around building in amplitude. In FIG. 4, the arrows at the edge show a whispering gallery mode propagating along the edges, with the field amplitude illustrated by the shaded region.

Figure 5:
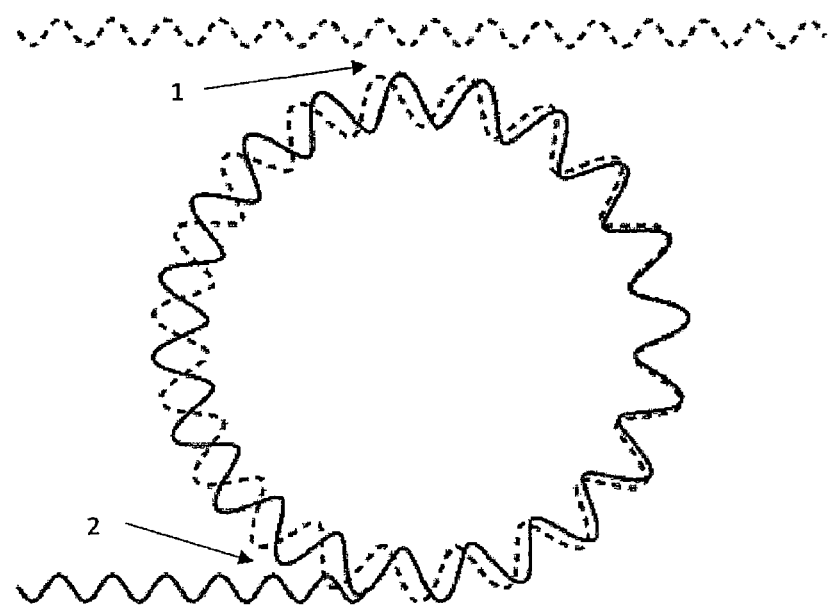
FIG. 5 is an exemplary illustration of light from a waveguide coupling into an optical resonator, through evanescent wave coupling and direct coupling.

FIG. 5 is an illustration of a circular or spherical optical resonator supporting whispering gallery modes and examples of coupling light into it. The upper part 1 illustrates evanescent wave coupling from a closely-spaced waveguide into an optical resonator and the lower part 2 illustrates direct coupling of light into an optical resonator. This allows multiple wavelengths to resonate in an optical resonator at various amplitudes based on wavelength inputs and waveguide/resonator geometry.

Figure 6:
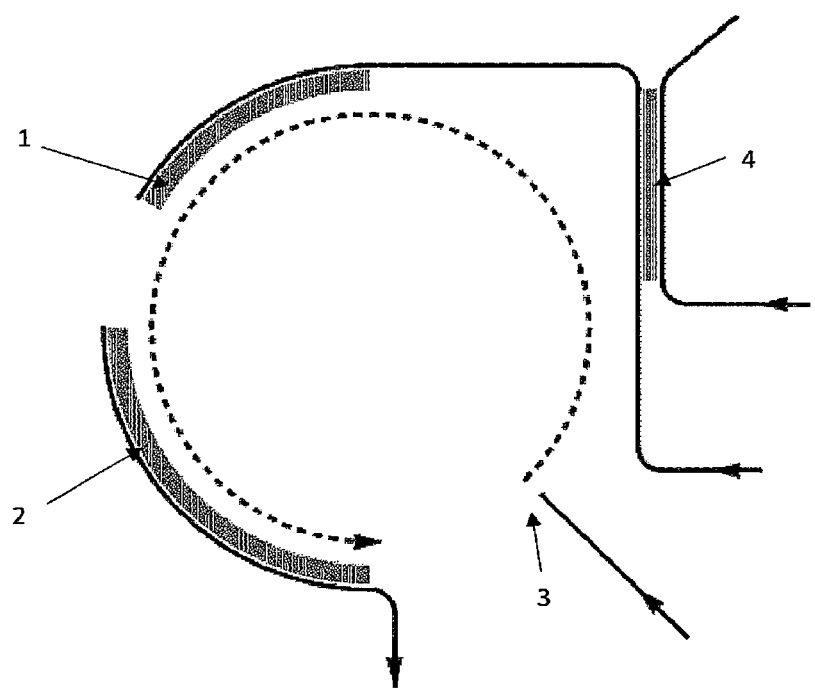
FIG. 6 is an exemplary illustration of a cross section of an optical resonator with multiple inputs, direct and coupled, as well as a coupled output.

FIG. 6 is an illustration of how a cross section of a cylindrical or spherical resonator may have multiple waveguides coupling into it, or out of it, through direct or evanescent wave coupling. An individual resonator with different wavelengths coupling into or out of it is generally meaningless aside from evanescent wave detection of "lab-on-a-chip" devices, but lays the fundamental groundwork for a network. In this example, shaded region 1 provides input evanescent wave coupling into an optical resonator while shaded region 2 provides evanescent wave output coupling from the resonator. Area 3 is a direct coupled input to the optical resonator, while shaded region 4 represents evanescent wave cross-coupling between an input wave guide prior to coupling region 1 and a separate waveguide from some other resonator in the system.

Figure 7:
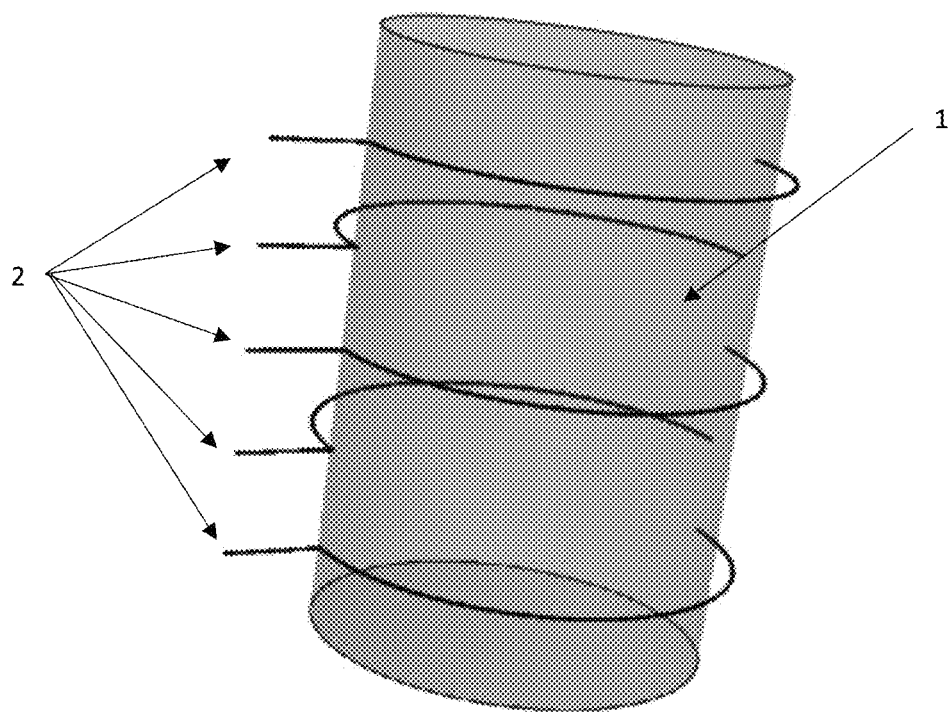
FIG. 7 is an exemplary diagram of a cylindrical optical resonator, allowing multiple waveguides to be coupled to a resonator in a layered fashion without having to physically contact each other.

FIG. 7 shows an example of a cylindrical optical resonator 1, wherein multiple waveguides may connect at different elevations in the structure, allowing a single resonator to connect via waveguides to many other resonators without any interference, aside from desired, engineered optical coupling.

Figure 8:
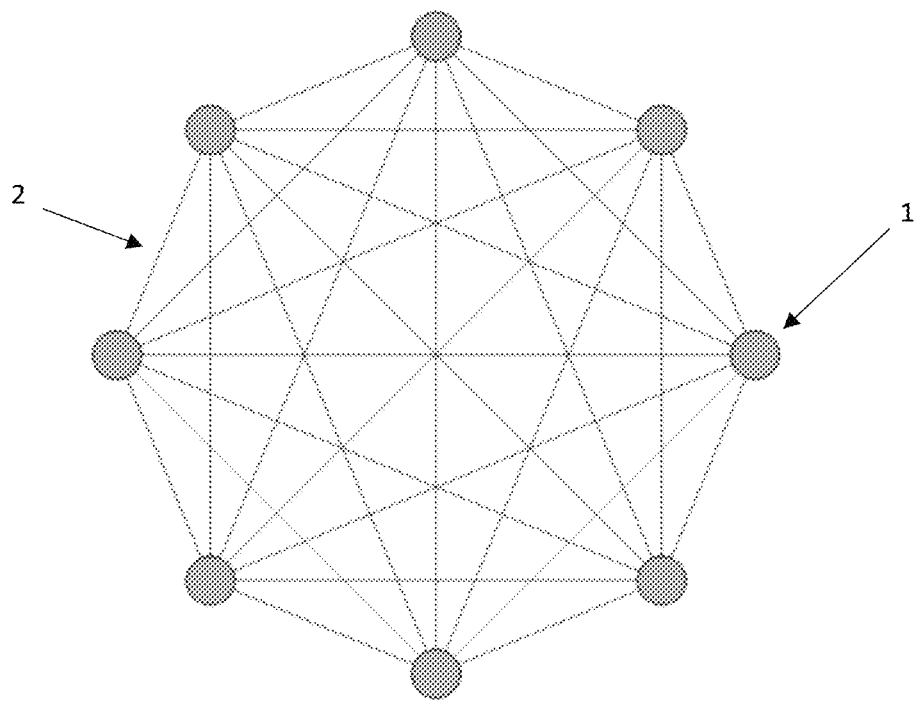
FIG. 8 is an exemplary illustration of a small neural network with interconnected optical resonators.

FIG. 8 shows a network of multiple optical resonators 1 connected via waveguide networks 2. It is simplified to show a single connection between each optical resonator, although in practice each connection could be a single or set of waveguides with a combination of direct and/or evanescent coupling as illustrated in FIG. 6. This allows for optical resonators which act as "neurons" in a neural network, with many analog connections, or "connectomes" connecting them to multiple other neurons.

Figure 9:
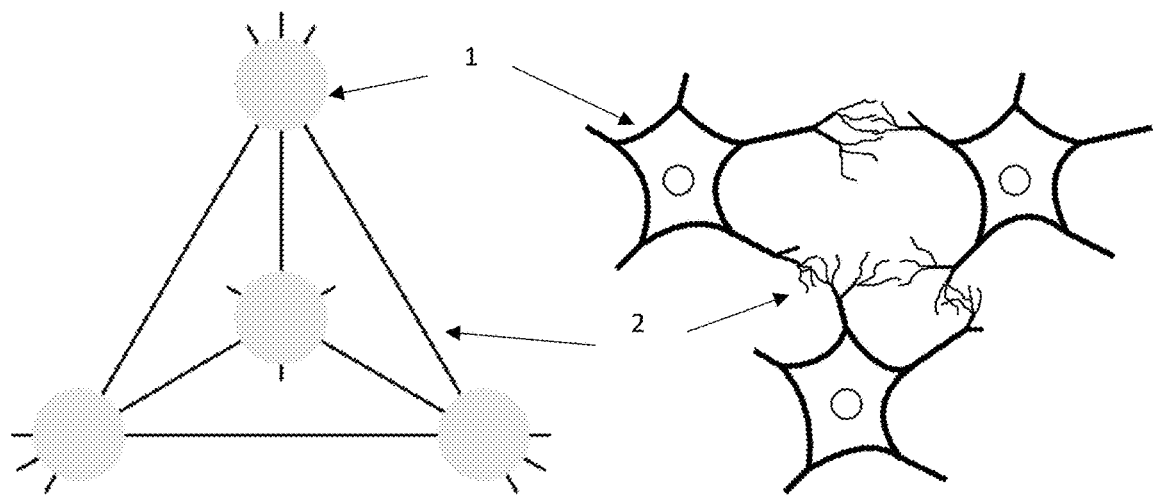
FIG. 9 shows an analogy between coupled optical resonators and couple neurons in a natural neural network in an organic brain with neurons and connectomes.

FIG. 9 shows a comparison of multiple optical resonators connected to each other and a corresponding biological connection of multiple neurons. In a human brain, there are on the order of 100 billion neurons, each with on the order of 1,000 connectomes connecting the neurons to other cells, though a cluster of around 100 connectomes may connect one neuron to another. The precise biology of the brain is complex, but can be generalized to analog voltages between the connectomes of the neurons based on complex biochemical and electrochemical transfer. This can be simulated via multiple wavelengths being multiplexed and coupled between waveguide networks between resonators. In this comparison, item 1 represents an optical resonator in the device of this invention, corresponding to a neuron cell body in a brain. Item 2 represents the waveguide connection between optical resonators and corresponds to the dendrite connectomes between neurons.

To fully simulate a human brain's thinking ability, 100 billion optical resonators may not be necessary since many of these neurons are for connection or linking only or are used for motor control rather than higher thinking. It is also possible to make the analog information transfer more efficient than the chemical process of a brain through high-density wavelength multiplexing, reducing the number of optical resonators needed to act as "neurons". In this figure, external waveguide and dendrite/connectome connections to additional resonators or neurons in the network are omitted for clarity.

Figure 10:
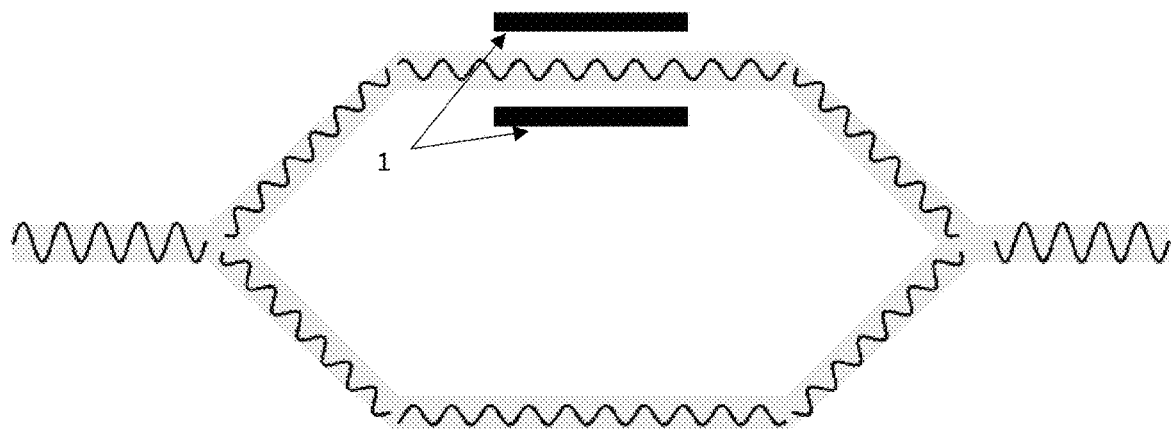
FIG. 10 is an example of a Mach-Zehnder interferometer where the electro-optic effect is used to control the amplitude of light in a waveguide by splitting, phase shifting, and recombining it.

FIG. 10 shows an optical modulator, in this case specifically a Mach-Zehnder interferometer modulator, allowing analog light signals to have their amplitude adjusted electronically. An electronic voltage across the plates 1 induces a change in the index of refraction, causing an optical time delay relative to another split in the waveguide. If there is no voltage applied, the signals will recombine in phase as they were at the waveguide input, but if there is a voltage, they will combine out of phase and diminish to near zero amplitude. In this way, a dynamic electronic control system can be used to modulate predetermined waveguide path connections so that the state of the optical resonators can change. Since the optical coupling is a purely linear process, electronic switching and detection would be needed for the system to change its state and handled electronically. There are different methods for modulating light in a waveguide, such as acousto-optic modulation, Mach-Zehnder interferometry, etc. Mach-Zehnder interferometers are easy to implement on the surface of an integrated optical structure, but more difficult to route inside. Other modulation sources may be used if needed.

Figure 11:
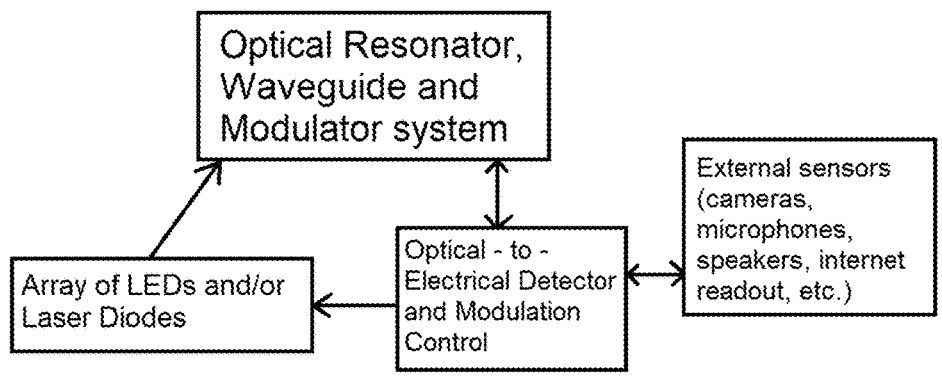
FIG. 11 is a block diagram showing how an electronic system can read optical amplitudes from the optical neural network and control individual connectome values with a feedback electro-optic modulation system.

FIG. 11 shows a block diagram of a system build for an optical neural network. The optical resonator, waveguide and modulator network is the primary new technology described in the previous figures. An input light source is necessary for the system to receive input optical signals for information processing and could be either a single wavelength or an array of multiple wavelengths that could be multiplexed into the input optical waveguides. In order to make the system work and perform a function as a brain does, feedback is necessary. This could include feedback adjusting the input amplitude of one or more of an array of input light sources of a plurality of wavelengths or feedback adjusting a waveguide amplitude at some point in the network, and subsequently downstream resonators and waveguides from this point. Changes can be detected by sampling various output waveguides at different wavelengths with electro-optical detectors and based on these values, subsequent modulations can be made to other areas in the network as part of a large-scale feedback or feedforward system.

Also possible for implementation is a set of external sensors such as electro-optical focal plane arrays from cameras or an analog electrical input from a microphone to feed sound and images into the system. These input signals could modulate either specific input wavelengths or specific waveguide networks, allowing these regions to be areas similar to visual or audio regions in a human brain that respond to sound and vision input changes. The higher the number of input wavelengths and feedback modulation, the more states can be achieved in the neural network leading to higher machine learning or artificial intelligence capabilities.

Figure 12:
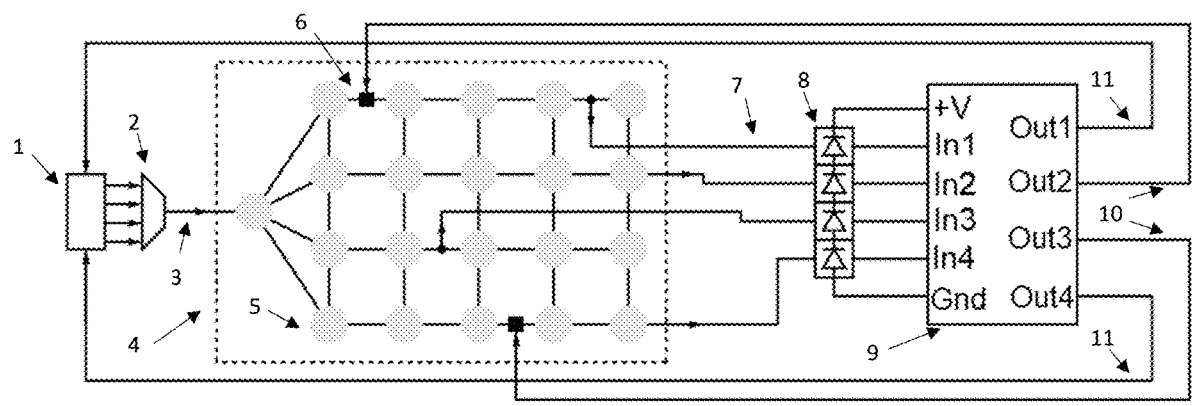
FIG. 12 is an exemplary small-scale optical neural network, illustrating optical light input, modulation, resonator networking and an electronic system for optical detection and electronic feedback control.

FIG. 12 shows an exemplary small-scale optical neural network. In this example, an emitter array 1 emits light into an optical multiplexer 2. A multiplexer is optional, but extremely advantageous for inputting multiple wavelengths into the system and increasing its capability. The input waveguide or waveguides, 3, inputs the light from the emitters into the optical resonator network 4. The optical resonator network consists of many individual optical resonators, 5, connected to each other via one or more waveguides. Some of these waveguides may have an optical modulator 6 with a feedback electrical signal for optical modulation. Some of the optical signals 7, either from a resonator directly or from a waveguide-coupling network, are routed to an optical to electrical detector 8. In this example, it is a photodiode array which converts the optical signals into electrical signals and sends them to electronic inputs of an Electronic Control Unit (ECU) 9. From here, the ECU can send feedback signals to either optical modulators 6 in the resonator network illustrated by outputs 10 or to the input light sources 1 themselves as illustrated by outputs 11.

In a small-scale model depending on application, there can be few optical resonators. In general though, as one tries to create a machine to mimic a human brain's intelligence or higher, a large number of optical resonators with many feedback mechanisms will be needed. In classical neural network architecture, the optical resonator and waveguide network corresponds to "hidden layers", with the number of layers growing with an increasing number of optical resonators, multiplexed wavelengths and feedback or feedforward electronic modulations based on input to, and output from, the ECU.

Figure 13:
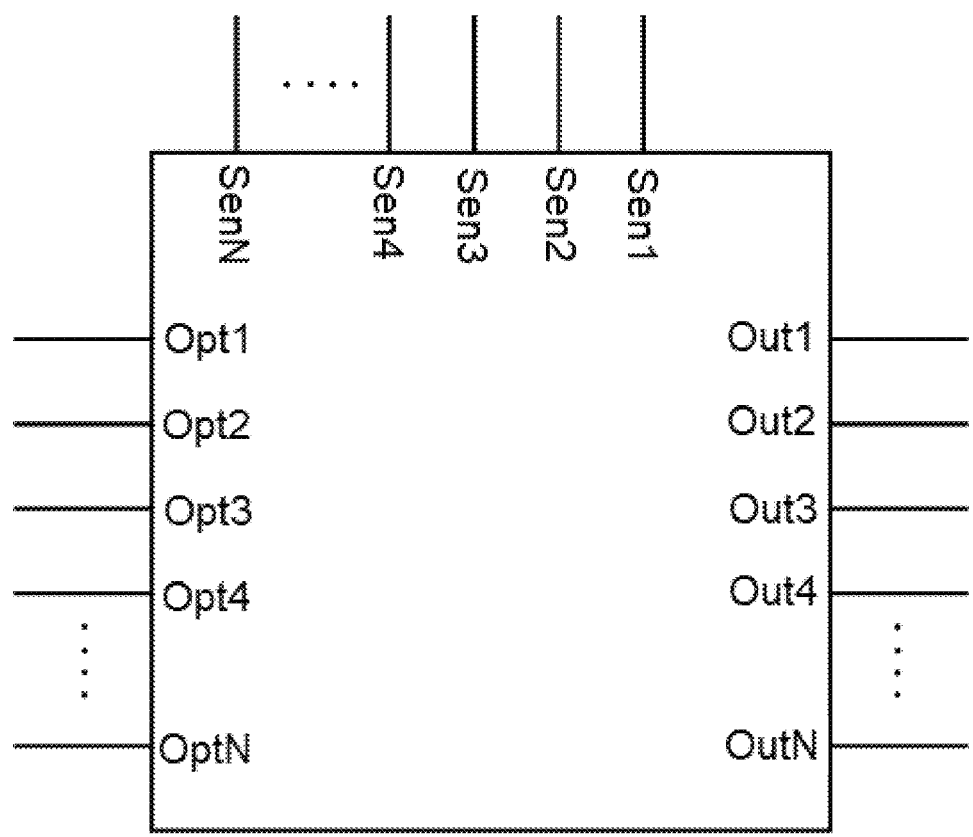
FIG. 13 is a larger implementation of an electronic control unit, with many potential optical inputs from the resonator network, as well as many external sensor inputs and many feedback outputs.

FIG. 13 shows a more advanced ECU which accepts an arbitrarily large number n of optical inputs, electronic sensing inputs, and outputs. The number of optical-to-electrical inputs could be huge, representing a binary or analog amplitude of any wavelength at any resonator or waveguide in the resonator network. The number of outputs can also be large, to enable many parts of the optical resonator network to be modulated and adjusted or one or more of the emitters to have their amplitudes modulated based on the ECU parameters or user options. Some of the outputs may not necessarily have to feedback to the neural network or emitters, but could be used as diagnostic signals for a user or external system. The sensor inputs represent more data added to the system from external sources. They could be a huge array of inputs, such as from a focal plane array of a camera giving "vision" to the system, a set of audio or sound data from a microphone giving it "hearing", arbitrary environmental sensors or other inputs such as arbitrary human text input or other file reading from other electronic devices.

This document illustrates the physical method for creating an optical neural network out of linear optics and electronic feedback controls. Mapping this physical architecture into a large-scale, computationally viable process is an enormous undertaking, the methods of which would constitute a separate invention. An ideal future goal would be to remove electronic processes completely, utilizing nonlinear optics entirely for feedback or feedforward modulation, but this level of optical nonlinearity is beyond current known nonlinear optical materials or manufacturing techniques. This is the current optimized embodiment of a primarily optical neural network with capability in current manufacturing techniques. Any similar or obvious variants of this should be considered the same invention.

The invention claimed is:

1. A device comprising: an input light source,
an optical medium containing a network of optical resonators connected by a plurality of connecting optical waveguides, wherein each resonator of the network of resonators has at least one of the plurality of connecting optical waveguides connecting it to at least one other resonator of the network of optical resonators,
a coupling mechanism allowing light from the input light source to enter the network of optical resonators,
a plurality of output waveguides to couple optical signals from the optical medium to a plurality of external output collection points in such a configuration that the optical signals at or beyond the external output collection points are not fed back to the network of optical resonators,
a plurality of photodetectors to collect the optical signals from the plurality of output waveguides and convert the optical signals into electronic signals,
an electronic feedback controller connected to the photodetectors to receive the electronic signals as electronic inputs, and an electronic output from the controller that feeds back into the optical medium and provides electro-optical modulation to one or more of the plurality of connecting waveguides based on the parameters internally set in the electronic controller and determined as a function of the electronic signals received from the photodetectors.

2. The device of claim 1, wherein the input light source is an array of light emitters with more than one unique wavelength.

3. The device of claim 2, wherein the electronic signals can also control a specific light emitter or a set of light emitters in the array.

4. The device of claim 1, wherein the coupling between the network of optical resonators and the connecting optical waveguides is wholly or partially through evanescent wave coupling without direct contact through at least one of the connecting optical waveguides with the optical resonator.

5. The device of claim 4, wherein at least one pair of the connecting optical waveguides are evanescently coupled to another of the connecting optical waveguide to couple this light to other resonators or the optical output to the photodetectors.

6. The device of claim 1, wherein the network of optical resonators and the connecting optical waveguides are configured in a physical implementation of a hidden layer of a neural network.

7. The device of claim 1, wherein the electronic controller has inputs from other electronic peripheral devices whose values contribute to the electronic signals, in addition to the electronic inputs from the photodetectors.

* * * * *